Nov. 22, 1949
J. H. COOPER ET AL
2,488,899
METHOD AND APPARATUS FOR FLASH-BUTT WELDING
Filed Oct. 8, 1945
2 Sheets-Sheet 1
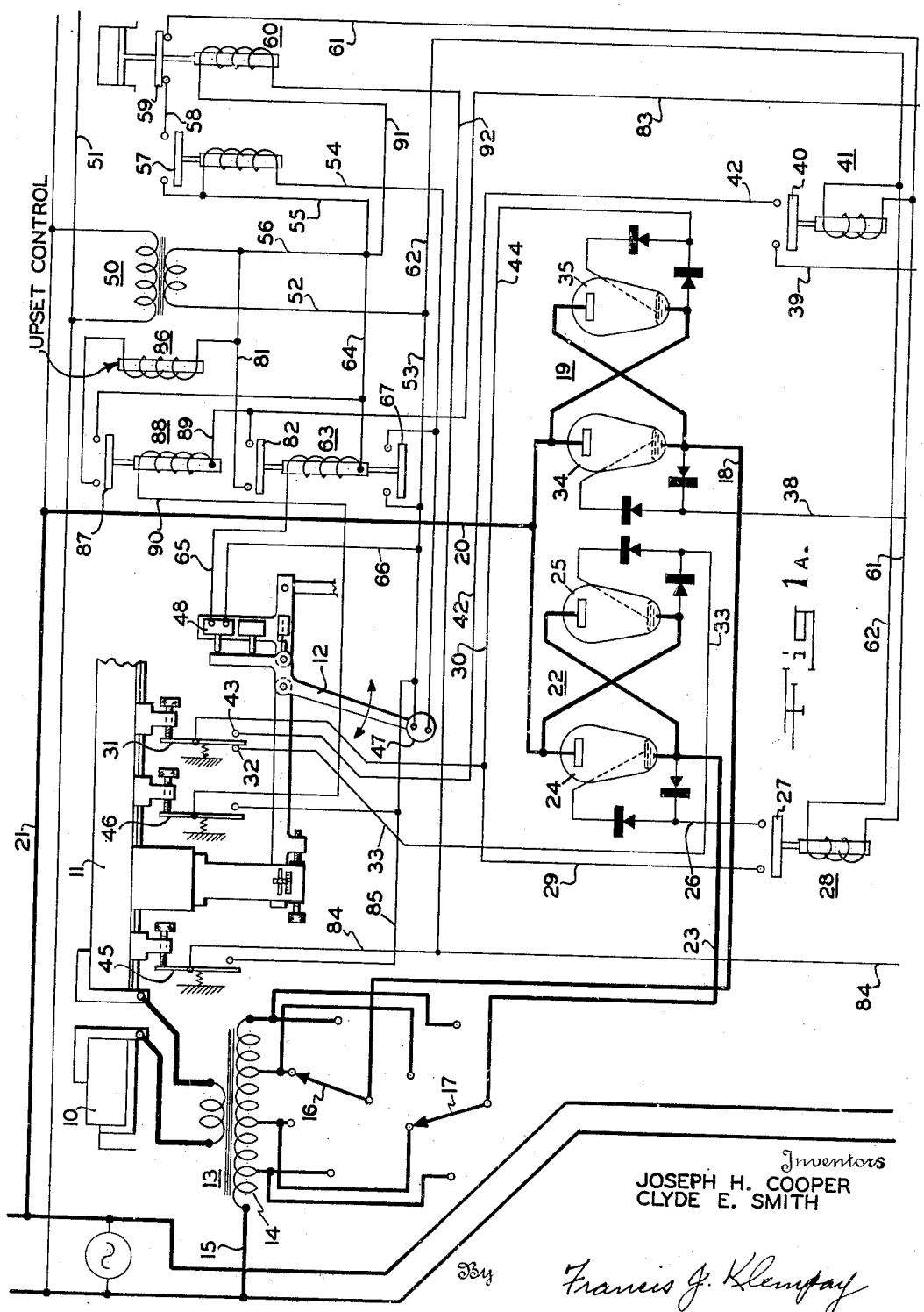
Inventors
JOSEPH H. COOPER
CLYDE E. SMITH
By Francis J. Klempay
Attorney

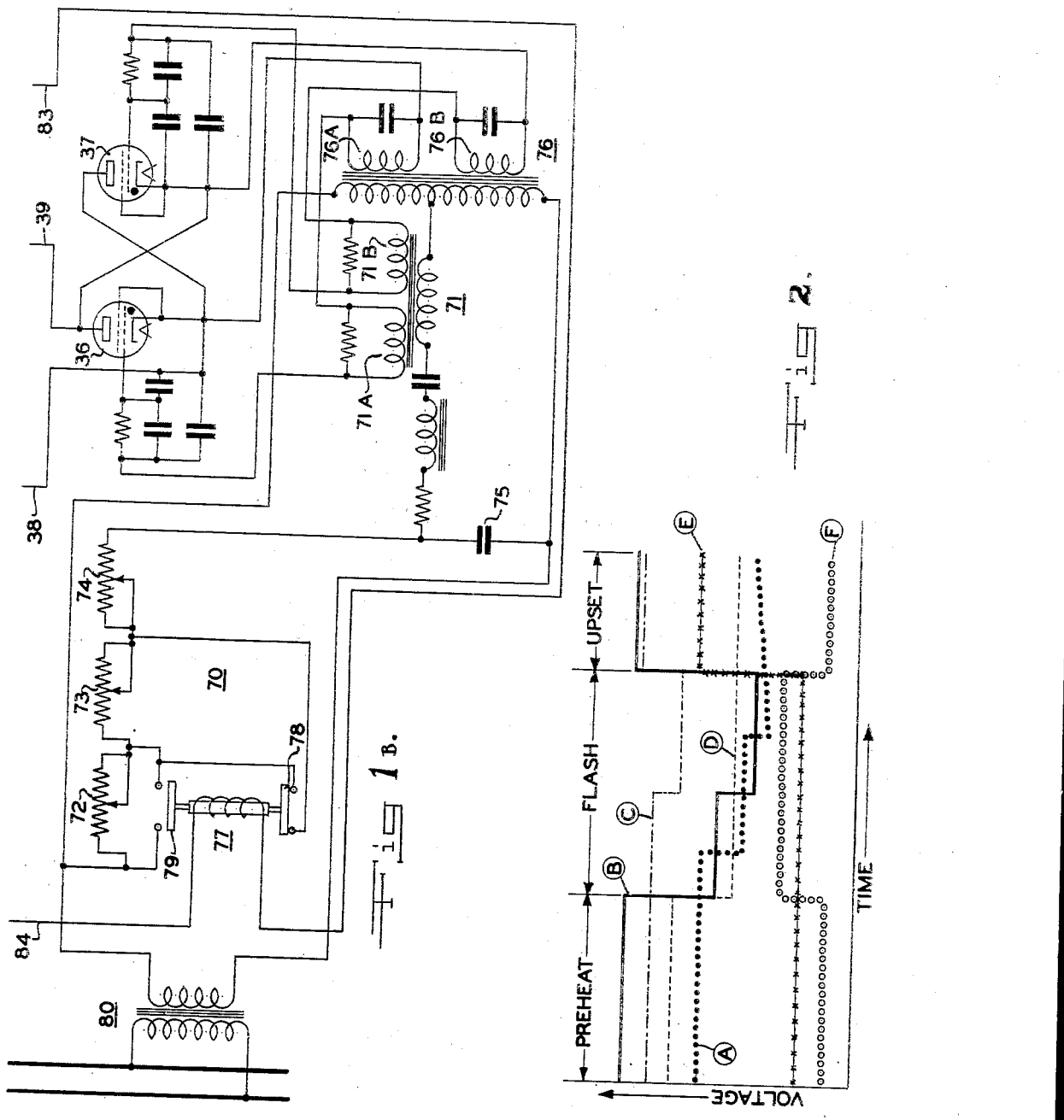

Patented Nov. 22, 1949

2,488,899

UNITED STATES PATENT OFFICE 2,488,899

METHOD AND APPARATUS FOR FLASH BUTT WELDING

Joseph H. Cooper and Clyde E. Smith, Warren, Ohio, assignors to The Taylor-Winfield Corporation, Warren, Ohio, a corporation of Ohio Application October 8, 1945, Serial No. 621,102

7 Claims. (Cl. 219—4)

This invention relates to electric resistance welding and more particularly to improved apparatus for controlling the welding current during flash welding cycles. The invention seeks to provide a substantially improved system for controlling the strength of current applied to the work pieces in flash welding processes whereby the flexibility and consequently the usefulness of such control in a broad variety of operations is materially enhanced. For example, the control provides for the application of an exceedingly wide range of effective voltages to the work pieces while enabling these voltages to be shifted from one value to another during the welding cycle either under automatic or manual control in such manner that all critical factors which enter into the making of quality flash-butt welds may be maintained under strict control.

One of the most critical of the above mentioned factors is the extent and rate of heating of the contiguous edges of the work pieces and the final temperature obtained therein at the time of upset. This necessitates a precise correlation of voltage applied to the work pieces with the speed of travel of the movable platen of the welding machine and because of the inherent mechanical limitations in the equipment it is more advantageous to effect the required adjustments in the electrical aspects and the present invention provides for infinite adjustments of the voltage applied during the stated critical period. Moreover, this precision control is effected while yet providing for an adjustable high initial preheating and/or flashing voltage. The advantages of preheating the work pieces in various classes of work are well known as is also the application of high voltages at the start of the welding cycle to assist in initiating the arc and the spread of the arc throughout the welding area.

A further and more specific object of the invention is the provision of improved methods of flash-butt welding and of improved apparatus for carrying out such methods. In the welding of wide thin material as strip, for example, difficulty is often experienced in squaring the material in the welding machine or the contiguous edges of the strip protruding from the dies of the welding machine are so irregular that successful welds are impossible of attainment. Heretofore this condition has been met by employing in the welding machine a squaring device either of the mechanical slitting type or of the flame or torch machining type so that the edges of the strip are prepared for welding after the strip lengths are securely clamped in the dies of the machine. According to the present invention the need for such ancillary devices is avoided, the protruding edges of the work pieces being squared or made parallel by electrical processes utilizing the same welding equipment as is used in carrying out the welding cycles. We have found that if maximum voltage is applied to the work pieces initially and the work pieces then brought together under manual control, the resulting arc, upon its initiation, is operative to melt and literally blast away all the protuberances on the edges of the strip so that in a short time contact can be established along the whole width of the strip, thus conditioning the strip edges in a very short interval of time and without loss of excessive quantities of metal. This mode of operation is made entirely practical by the voltage control of the invention.

Other objects of the invention include the provision of a practical and improved flash-butt welder voltage control system which will effectively reduce the maximum kva. power demand of the machine and the provision of simplified and improved instrumentalities for changing the voltages applied to the work pieces during the welding cycles. The first mentioned object may be accomplished in accordance with the invention, by reducing the welding transformers turns ratio at time of preheat and upset to reduce the surge of current (at low power factor) resulting from the short-circuiting preheat and upset contact but is more advantageously accomplished by reducing the portions of the successive half cycles of the current source transmitted to the transformer. The second object is accomplished primarily by improved power contactor arrangements and by employing at least one electronic power contactor together with improved means to vary the conduction in the same.

Another object of this invention is the provision of an improved general control system for a flash-butt welding machine wherein the integration of voltage control systems of the nature outlined above with the mechanical elements of the machine is made possible in an effective and advantageous manner.

The above and other objects and advantages of the invention will become apparent upon consideration of the following detailed specification and the accompanying drawing wherein there is disclosed a preferred embodiment of the invention.

In the drawing:

Figure 1 is a schematic representation of an electrical resistance flash-butt welding machine constructed according to the principles of the invention; and Figure 2 is a set of curves showing various voltage relationships which may be attained through the control system of Figure 1.

For a complete showing and fuller description of a flash welder platen movement control means to which the present invention is applicable reference is made to U. S. Patent 2,373,226, assigned to the assignee of the present invention.

Referring to the drawing, reference numeral 10 designates the normally fixed platen of a flash-butt welder while reference numeral 11 is the movable platen which may be hydraulically operated by the apparatus and in the manner disclosed in the above mentioned patent. In accordance with said disclosure there is an operating lever 12 which, within certain limits, may effect movement of the platen 11 under complete manual control but when the lever is moved to the left to latched position the movement of the platen 11 is under automatic control of the cam and the follow valve. Welding current is furnished by a transformer 13 having a tapped primary winding 14 having one of its end terminals connected with the current source through conductor 15. To enable maximum use to be made of the principles of the invention we employ a pair of regulators connected in parallel with the respective taps of the primary winding 14, these regulators having movable contact arms 16 and 17, respectively. To complete the energizing circuit for the transformer 13 through the regulator arm 16 we provide a circuit consisting of the conductor 18 and electronic contactor 19 and conductors 20 and 21, the latter of which is connected with the source. A suitable circuit controlling device, preferably the electronic contactor 22 is employed in a circuit consisting of a conductor 23 and conductors 20 and 21 to energize the transformer 13 through the regulator having arm 17.

The electronic contactor 22 consists of a pair of ignitrons 24 and 25 connected back-to-back and each having an anode firing ignition circuit made possible by the associated rectifiers shown, which rectifiers are preferably of the dry disk type as will be understood. These ignition circuits have a common lead and, in the embodiment of the invention illustrated, a pair of controlling switches is placed in this lead—the circuit being traceable from the junction of the rectifiers associated with the ignitron 24 through conductor 26, contactor 27 of a relay 28, conductor 29, conductor 30, the common contact of a double throw limit switch 31, contact 32 of switch 31, and conductor 33 to the junction of the rectifiers associated with the ignitron 25. It will be obvious that upon closure of both these switches in this return circuit the contactor 22 will conduct the major part of the successive positive and negative half cycles of the source current.

The electronic contactor 19 comprised of the back-to-back connected ignitrons 34 and 35 has similar anode firing ignition circuits also having a common return conductor in which are similar controlling switches but with the very important difference that in this return conductor there is additionally included a full-wave controlled-conduction device consisting of a pair of gaseous discharge devices 36 and 37 connected in inverse parallel. Thus, the circuit of the common return in the ignition circuits of contactor 19 may be traced from the junction of the rectifiers associated with ignitron 34 through conductor 38, cathode of tube 36 (anode of 37), anode of tube 36 (cathode of tube 37), conductor 39, contactor 40 of relay 41, conductor 42, contact 43 of switch 31, and conductors 30 and 44 to the junction of the rectifiers associated with the ignitron 35. It will be obvious that upon closing of the switches 31 and 40 in the above described common return circuit the ignitrons 34 and 35 are fired during the respective positive and negative half cycles of the source current at times determined by the phase relation of the periods of conduction in the gaseous discharge devices 36 and 37.

In order to correlate the electrical control system disclosed herein and particularly the voltage shifting features thereof with the mechanical operation of the welding machine we provide a number of manual switches and a number of automatically operated limit switches, the latter of which are arranged to be operated in accordance with the progression of the movable platen during the welding cycle. Thus, these limit switches may be operated either directly by the platen or by the position of a slide as shown in the above mentioned patent which slide mounts the cam determining the pattern of movement of the platen. In the drawing, such limit switches are shown at 31, 45, and 46 and by way of example switch 31 may be so adjusted that it is actuated shortly after the work pieces held by the platens begin flashing during forward movement of the movable platen 11. Switch 45 may be adjusted to close at any time during the flashing period and switch 46 is adjusted to close at point of upset. A thumb switch 47 is mounted on the operating arm 12 and the switch 48 is mounted on the control linkage structure in such a manner that it is closed when the arm 12 is latched in the position shown for complete automatic operation of the machine. We provide a control relay 49 which is arranged to be energized from a transformer 50 (deriving energy from the source through conductors 21 and 51) through the circuit comprised of conductors 52 and 53, switch 47, conductor 54, coil of relay 49 and conductors 55 and 56. Upon energization of relay 49, relay 41 is energized through the circuit-line conductor 56, conductor 55, contactor 57 of relay 49, conductor 58, normally closed contact 59 of a time delay relay 60, conductor 61, coils of relay 28 and 41 (in parallel) and conductors 62 to line conductor 52. As shown, contact 32 of switch 31 is normally closed so that immediately upon energization of relay 28 the contactor 22 is now conditioned for full conduction and the welding transformer 13 is energized to an extent determined by the setting of the regulator arm 17. This pre-set voltage value may be employed for the pre-heating of the work pieces in certain classes of work, the pieces being jammed together by manipulation of the arm 12 in the manner explained in the above mentioned patent, or in the case of strip welding, for example, this initial voltage may be set at the maximum available on the machine and utilized to align or condition the strip edges preparatory to the welding proper as explained above. We provide another control relay 63 adapted to be energized upon closure of switch 48 through the circuit-conductors 56 and 64, coil of relay 63, conductor 65, switch 48, and conductors 66, 53, and 52. Energization of relay 63 closes a holding circuit comprised of a contactor 67 on relay 63 for continuing the energization of relay 49 upon the release of thumb switch 47 so that the operator may take his hands entirely off the controls after the latter are set for automatic operation. Of course, the stock must be flashing when the operating arm 12 is latched and under the settings herein specified the initial flashing voltage will be the voltage at which the regulator arm 17 is set. This is illustrated by line A in Figure 2. As the flashing proceeds, switch 31 is actuated and contact 32 opens while 43 is closed thus opening the common return in the ignition circuits for contactor 22 while closing the common return in the ignition circuits for contactor 19 and contactor 22 will thereupon cease to conduct.

Conditioning of the ignition circuits for the ignitrons of contactor 19 will cause this contactor to conduct such portions of the successive half-waves of the current source as is predetermined by the phase relation of the periods of conduction in the tubes 36 and 37. A fixed setting of the voltage applied to the welding load during this time is, of course, furnished by the position of the regulator arm 16. The phase relation of the periods of conduction in the tubes 36 and 37 is controlled by a phase shifting circuit, indicated generally by the reference numeral 70, the output of which is connected across the primary winding of an impulse transformer 71. Circuit 70 includes the serially connected potentiometers 72, 73 and 74, capacitance 75, and inductances comprising the two sections of a center tapped primary of a biasing transformer 76. We provide a control relay 77 having a normally closed contactor 78 which shorts out the potentiometer 73 and normally opened contactor 79 which is connected to short out the potentiometer 72 upon energization of the coil of the relay. Thus, when relay 77 is de-energized the resistance leg of the phase shifting circuit is made up of resistances 72 and 79 but upon energization of relay 77 the resistance leg is made up of resistances 73 and 74. By varying the relative settings of the potentiometers 72 and 73 the phase deviation angle may be pre-set for both the opening and the closing of the relay 77.

The primary winding of transformer 76 is connected across a suitable alternating voltage source comprised of the secondary of a transformer 80 which in turn has its primary connected with the common source of alternating potential. Transformers 71 and 76 each have two secondary windings for the grid control circuits of the tubes 36 and 37. The control circuit for tube 36 may be traced from the cathode thereof through winding 76A of transformer 76 and winding 71A of transformer 71 to the control grid thereof. The control circuit for tube 37 may be traced from the cathode thereof through the secondary winding 76B of transformer 76 and secondary winding 71B of transformer 71 to the control grid thereof.

The coil of relay 77 is in a circuit which may be traced from the line conductor 56 through conductor 81, contactor 82 of relay 63, conductor 83, coil of relay 77, conductor 84, switch 45, and conductors 85 and 53 to line conductor 52. Relay 63 is normally energized during the welding cycle to hold contactor 82 closed so that at any desired time during the flashing period as determined by the setting of limit switch 45 the circuit 70 may be automatically readjusted to change the phase relation of the periods of conduction in the tubes 36 and 37. Normally it is desirable to reduce the voltage applied to the work pieces after flashing has progressed for appreciable time and therefore potentiometer 73 will be normally set to effect, when it is brought into the shifting circuit, a further delay in the firing of the tubes 36 and 37 with respect to the anode-cathode potential appearing at the ignitrons 34 and 35.

Reference numeral 86 designates a control solenoid which is operative, when energized, to effect quick up-setting movement of the platen 11 through suitable means, not shown, and is arranged to be energized upon the closing of contactor 87 of relay 88. The energizing circuit for the coil of the latter may be traced from conductor 56 through conductor 81, contactor 82, conductor 89, coil of relay 88, conductor 90, switch 46, and conductor 85 and 53 to conductor 52. In the specific circuit illustrated, the voltage at upset is the same as the final flashing voltage, as shown by line A in Figure 2, but it will be obvious to those skilled in the art that by the use of suitable conventional control relay devices the system may be adjusted either to cut off the current entirely at point of upset or to raise or lower the voltage at point of upset as desired. Thus, additional potentiometers may, if desired, be inserted in the resistance leg of the phase shifting circuit together with accompanying relays having shorting contactors arranged to be actuated at any predetermined time during the welding cycle.

In the circuit illustrated, the coil of the time delay relay 60 is energized at point of upset by the circuit consisting of conductors 56 and 91, coil of relay 60, conductors 92 and 84, switch 45, and conductors 85, 53, and 52. Upon relay 60 timing out its period, both the relays 28 and 41 are de-energized and all the ignition circuits for contactors 19 and 22 are opened. All current then ceases to flow and if the machine is provided with automatic work clamps the same are opened at this time. To retract the slide back to its initial starting position the lever 12 is moved to the right, as viewed in Figure 1, thereby opening switch 48 and restoring the other switches 31, 45 and 46. Opening of switch 48 de-energizes relay 63 which in turn de-energizes relay 47 and upon the backing off of the movable platen 11 switches 45 and 46 open to de-energize relays 88, 60 and 70 thereby restoring the system to its initial condition preparatory to the next succeeding cycle of operation.

The above specifically described circuit embodiment of the invention should be considered merely as illustrative since the invention is considered to reside as much in the correlation of the disclosed control methods and system with the mechanical operation of the welder as with the control methods and system per se. A wide variety of coordinations may be effected and some of these are illustrated in Figure 2. Thus line B represents a cycle wherein the voltage is dropped at the start of flashing, further reduced during flashing, and sharply increased at the time of upset. This cycle may be effected by adjusting switch 31 to change over at the start of flashing and by utilizing a "take-over" relay to restore conduction in contactor 22 at the point of upset. Curve C illustrates a cycle wherein the voltage is reduced but once before upset and then increased at the time of upset. This may be accomplished by setting potentiometers 72 and 73 so that energization of relay 77 will increase the voltage and by setting switch 45 to close coincidentally with the closing of the upset switch 46. In the cycle represented by curve D the voltage is reduced only at the beginning of flashing and this, of course, may be accomplished simply by backing off and rendering inoperative the switch 45 and adjusting switch 31 to change over at the beginning of flashing. In the cycle E the preheating and flashing voltage is constant while a higher upset voltage is used and to accomplish this, switch 31 may be adjusted to hold contactor 43 closed at all times while switch 45 is adjusted to close at point of upset and circuit 70 is adjusted to bring the conduction periods in tubes 36 and 37 closer in phase with the alternations of the source. In cycle F a high flashing voltage is used while the upset voltage is less and this may be scheduled by the setting of potentiometers 72 and 73 as will be understood.

It should now be apparent that we have provided an improved voltage control system for an electric resistance flash-butt welder which accomplishes the objects initially set out. The control provides for the application of a substantially infinite range of voltages to the work pieces and enables the voltage to be abruptly shifted from one value to the other during the welding cycle. Moreover, the system may have such operating characteristics, if properly adjusted, that high voltage may be applied to square or condition the edges of the work pieces preparatory to the actual welding cycle after which lower and program-stepped voltages may be applied in effecting the actual welding operation. In general, the control system of the invention is capable of being so correlated with the welding machine that optimum heating and flashing conditions may be obtained in all classes of work and under all conditions of operation.

Since, as explained above, the specific circuit arrangements disclosed herewith are capable of wide and obvious modifications, depending on the particular character of the work at hand, reference should be had to the appended claims in determining the scope of the invention.

What we claim is:

1. A voltage control system for a flash-butt welder having a movable platen comprising in combination a welding transformer having a tapped primary winding and a secondary adapted to be connected to the work pieces, a current source, a controllable conducting means interconnecting said source with one of the taps of said primary winding, a pair of ignitrons connected in inverse parallel intermediate said source and another of the taps of said primary winding and each having an ignition circuit, means to condition said conducting means at the start of the welding cycle, means to control said ignition circuits, and means operable automatically upon predetermined advanced movement of said platen to render inoperative said conducting means while actuating said means to control in such manner that said ignitrons are rendered conducting, said means to control further including means to render said ignitrons conductive at predetermined adjustable times during the successive half-waves of the voltage alternations of said source.

2. A voltage control system for a flash-butt welder having a movable platen comprising in combination a welding transformer having a tapped primary winding and a secondary adapted to be connected to the work pieces, a current source, a controllable conducting means connecting said source with one of the taps of said primary winding, a pair of ignitrons connected in inverse parallel intermediate said source and another of the taps of said primary winding, an ignition circuit for said ignitrons, a pair of control circuits for said ignition circuits operative to condition said ignitrons at different times during the successive alternations of said source whereby the value of the effective current transmitted by said ignitrons may be varied, means to condition one of said pair of control circuits, and means operative in response to said platen attaining a predetermined advanced position to condition the other of said pair of control circuits while rendering inoperative the said one of said pair of control circuits.

3. A voltage control system for a flash-butt welder having a movable platen and a lever for manually controlling the movement of said platen at least during the initial part of the welding cycle, a welding transformer having a tapped primary winding and a secondary adapted to be connected to the work pieces, a current source, a controllable conducting means connecting said source with one of the taps of said primary winding, a pair of ignitrons connected in inverse parallel intermediate said source and winding, an ignition circuit for said ignitrons, a pair of control circuits for said ignition circuit operative to condition said ignitrons at different times during the successive alternations of said source whereby the value of the effective current transmitted by said ignitrons may be varied, manual means associated with said lever to activate said controllable conducting means, means responsive to said lever attaining a predetermined advanced position to condition one of said pair of control circuits, and means operative in response to said platen attaining a predetermined advanced position to condition the other of control circuits while rendering inoperative the said one of said pair of control circuits.

4. A voltage control system for a flash-butt welder having a movable platen and a lever for manually controlling the movement of said platen at least during the initial part of the welding cycle, a current source, manual means associated with said lever to initiate flow of current from said source to the work pieces, means to control the flashing current comprising a pair of ignitrons connected in inverse parallel between said source and work pieces and having an ignitron circuit, phase shifting means controlling said ignition circuit whereby the value of the effective current transmitted by said ignitrons may be varied, control means coupled with said phase shifting means and operative upon said lever attaining a predetermined advanced position to transmit one current value to the work pieces, and control means coupled with said phase shifting means and operative upon said platen reaching a predetermined advanced position to transmit another value of current to said work pieces.

5. The method of flash-butt welding which consists of applying an alternating current to the work pieces being welded to initiate flashing therebetween, and reducing the effective value of said current during the flashing period by reducing the portions of the consecutive half cycles of the current source transmitted to said work pieces.

6. The method of flash-butt welding which consists of applying an alternating current to the work pieces being welded to initiate flashing therebetween, and reducing the effective value of said current by reducing at a predetermined time during the welding cycle the portions of the consecutive half cycles of the current source transmitted to said work pieces.

7. The method of flash-butt welding wide thin sections which consists of applying an initial high alternating current voltage to said sections to very rapidly flash off irregularities in the adjacent edges thereof thus effecting a substantially uniform space throughout the cleft between said sections, and thereafter reducing the effective value of said current during the flashing period by reducing the portions of the consecutive half cycles of the current source transmitted to said sections.

JOSEPH H. COOPER.
CLYDE E. SMITH.

REFERENCES CITED

The following references are of record in the file of this patent:

UNITED STATES PATENTS

| Number | Name | Date |
|---|---|---|
| 1,916,012 | Otto | June 27, 1933 |
| 1,916,013 | Otto | June 27, 1933 |

FOREIGN PATENTS

| Number | Country | Date |
|---|---|---|
| 559,658 | Great Britain | Feb. 24, 1944 |